(12) United States Patent
Hsu et al.

(10) Patent No.: US 11,150,402 B2
(45) Date of Patent: Oct. 19, 2021

(54) LIGHTING DEVICE COMPRISING SLIDABLY DISPOSED POSITIONING MEMBER

(71) Applicants: RADIANT OPTO-ELECTRONICS (SUZHOU) CO., LTD., Jiangsu (CN); Radiant Opto-Electronics Corporation, Kaohsiung (TW)

(72) Inventors: Pai-Ho Hsu, Kaohsiung (TW); Jui-Fang Wu, Kaohsiung (TW); Ming-Huang Yang, Kaohsiung (TW)

(73) Assignees: RADIANT OPTO-ELECTRONICS (SUZHOU) CO., LTD., Jiangsu (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 17/142,777

(22) Filed: Jan. 6, 2021

(65) Prior Publication Data

US 2021/0208331 A1 Jul. 8, 2021

Related U.S. Application Data

(63) Continuation of application No. PCT/CN2020/070468, filed on Jan. 6, 2020.

(51) Int. Cl.
*F21V 8/00* (2006.01)

(52) U.S. Cl.
CPC ......... *G02B 6/0088* (2013.01); *G02B 6/0078* (2013.01); *G02B 6/0095* (2013.01)

(58) Field of Classification Search
CPC ... G02B 6/0078; G02B 6/0088; G02B 6/0095
See application file for complete search history.

(56) References Cited

U.S. PATENT DOCUMENTS

| | | | | |
|---|---|---|---|---|
| 6,305,109 | B1 * | 10/2001 | Lee | G02B 6/0068 40/546 |
| 9,395,478 | B2 * | 7/2016 | Fisher | F21S 8/043 |
| 2005/0235570 | A1 * | 10/2005 | Ginzel | E06B 3/4609 49/409 |

(Continued)

FOREIGN PATENT DOCUMENTS

| | | |
|---|---|---|
| CN | 204372586 U | 6/2015 |
| CN | 105650555 A | 6/2016 |

(Continued)

*Primary Examiner* — Keith G. Delahoussaye
(74) *Attorney, Agent, or Firm* — Muncy, Geissler, Olds & Lowe, P.C.

(57) ABSTRACT

A lighting device is provided and comprises a housing, a light source module, a light guiding module, and a positioning member. The housing has an accommodating space. The light source module is disposed in the accommodating space. The light guiding module is configured to receive the light emitted from the light source module, and the light guiding module includes at least two light guiding plates. The positioning member is slidably disposed in the accommodating space of the housing. The two light guide plates are configured in the accommodating space of the housing and are coupled to the opposite sides of the positioning member, so that the positioning member supports and positions the two light guide plates.

13 Claims, 7 Drawing Sheets

(56) References Cited

U.S. PATENT DOCUMENTS

2014/0063847 A1* 3/2014 Sakamoto ............ G02B 6/0068
362/609
2019/0094457 A1* 3/2019 Wu ......................... F21V 15/01
2021/0062999 A1* 3/2021 Schmidt ............... G02B 6/0063

FOREIGN PATENT DOCUMENTS

| | | |
|---|---|---|
| CN | 107068009 A | 8/2017 |
| CN | 206514095 U | 9/2017 |
| CN | 208566383 U | 3/2019 |
| CN | 109844402 A | 6/2019 |
| CN | 209782518 U | 12/2019 |
| KR | 20110085126 A | 7/2011 |
| KR | 20180007018 A | 1/2018 |
| TW | 201619551 A | 6/2016 |
| TW | 201915387 A | 4/2019 |

* cited by examiner

LIGHTING DEVICE COMPRISING SLIDABLY DISPOSED POSITIONING MEMBER

RELATED APPLICATIONS

This application is a continuation application of International Application No. PCT/CN2020/070468, filed on Jan. 6, 2020, which is incorporated herein by reference.

BACKGROUND OF THE INVENTION

1. Field of the Invention

The present invention relates to a lighting device, and in particular, to a lighting device that is easy to assemble.

2. Description of the Prior Art

In the current lighting devices, some lighting devices have a light source module configured in a housing, and the light guide module is suspended below the housing. However, the suspended lighting devices often causes the light guide module to disengage from the housing due to shaking or collision during transportation.

In order to avoid the above situation, some lighting devices have a plurality of openings on the light source module, so that positioning posts can pass through the housing and the plurality of openings to prevent the light guide module from falling. However, this configuration will cause shadows in the area adjacent to the positioning posts, and additional openings on the light source module will also increase manufacturing time and costs.

Therefore, it is desirable to design a lighting device that is easy to assemble, can be fastened securely, low cost, and does not affect the light shape.

SUMMARY OF THE INVENTION

To address the deficiencies of conventional products, an embodiment of the invention provides a lighting device that is easy to assemble.

The lighting device comprises a housing, a light source module, a light guiding module, and a positioning member. The housing includes an accommodating space. The light source module is disposed in the accommodating space. The light guiding module is configured to receive the light emitted from the light source module, and the light guiding module includes at least two light guiding plates. The positioning member is slidably disposed in the accommodating space of the housing. The two light guide plates are configured in the accommodating space of the housing and are coupled to the opposite sides of the positioning member, so that the positioning member supports and positions the two light guide plates.

In some embodiments, the accommodating space of the housing has a first passage, a second passage, and an opening. The second passage is located between the first passage and the opening and communicates with each other. The light source module is disposed in the first passage of the accommodating space. The positioning member is located in the second passage of the accommodating space, and the two light guide plates is extended outside of the opening.

In some embodiments, the housing has a first section, a second section, and a third section. The second section is connected between the first section and the third section, and the first section and the second section restrict the movement of the positioning member along the second passage. The first section surrounds and defines the opening of the accommodating space. The second section surrounds and defines the second passage of the accommodating space, and the third section surrounds and defines the first passage of the accommodating space.

In some embodiments, the positioning member further includes at least two first convex portions for abutting against the first section.

In some embodiments, the positioning member further includes at least two second convex portions for abutting against the third section.

In some embodiments, the first convex portion and the second convex portion are extended in the opposite directions.

In some embodiments, the housing is extended along a long axis to form a length and forms a width along a short axis. The short axis and the long axis are perpendicular to each other. The positioning member is formed with two first notches. The two first notches are symmetrical to the short axis, and each of the two light guide plates has a depression portion to be engaged with the corresponding first notch.

In some embodiments, the housing forms a height along a central axis. The central axis is perpendicular to the short axis and the long axis, and the dimension of the depression portion along the central axis is greater than a thickness of the positioning member.

In some embodiments, the depression portion has an upper surface and a lower surface. The upper surface abuts against a top surface of the positioning member, and the bottom surface of the positioning member does not abut against the lower surface.

In some embodiments, the positioning member further includes two first guiding inclined surfaces which guide each of the light guide plates into the corresponding first notch.

In some embodiments, the housing is extended along a long axis to form a length and forms a width along a short axis. The short axis and the long axis are perpendicular to each other. The positioning member is formed with two first notches and two second notches. The two second notches communicate with the first notches. Each of the two light guide plates has a depression portion to be engaged with the corresponding second notch. The dimension of the light guide plates along the short axis is greater than the dimension of the first notch along the short axis.

In some embodiments, the positioning member further includes two second guiding inclined surfaces, which guide each of the light guide plates into the corresponding second notch.

In some embodiments, the lighting device further includes two fixing elements. Each of the fixing elements pass through the housing and the corresponding light guide plate, so that the light guide plates are fixed to the housing.

The lighting device comprises a housing, a positioning member, and two light guide plate. The positioning member can be made of metal materials, and is slidably disposed in the accommodating space. The light guide plate can engage with the opposite sides of the positioning member. Since the light guide plate abuts against the top surface of the positioning member at the same time, the distance between the light guide plate and the light source module is equal, so that the lighting device can have better optical efficiency.

In addition, when the light guide plate expands due to environmental factors, the positioning member can move accordingly with its expansion. Therefore, the design of the invention can prevent from deformation or affecting optical characteristics caused by the collision of the expanded light guide plates.

Furthermore, due to the design of the positioning member of the invention, the components for fixing the light guide plates can be greatly reduced, so that reducing costs is achievable.

BRIEF DESCRIPTION OF THE DRAWINGS

The invention can be more fully understood by reading the following detailed description of the embodiment, with reference made to the accompanying drawings as follows. It should be noted that, in accordance with industry standard practices, the components are not drawn to scale and are used for illustrative purposes only. In fact, for the sake of clarity, the dimension of components may be arbitrarily shown.

DETAILED DESCRIPTION OF THE PREFERRED EMBODIMENTS

A preferred embodiment of the invention will be introduced with reference to appended figures as follows to demonstrate that the invention may be implemented. The configuration of each component in the specific embodiments discussed are merely for illustrative purpose, and do not limit the scope of the invention. The repetition of the reference numerals in the appended figures is for simplifying the explanation, and does not indicate the correlation between different embodiments. Direction terms mentioned by the invention, for example "upper", "lower", "left", "right", "front", "rear", etc. are merely directions in the appended figures for only explaining and illustrating the invention but not to limit the protection scope of the invention.

The ordinal numbers in the invention, for example "first", "second", "third", etc. do not have a sequential relationship, and they are only used to distinguish two different components with the same name.

In addition, the relative terms, such as "lower" or "bottom" and "higher" or "top" may be used in the invention to describe the relative relationship of one component to another component in the appended figures. It can be understood that if the illustrated device is turned upside down, the components described on the "lower" side will become the components on the "higher" side.

The terms "about" and "approximately" usually indicate within 20% of a given value or range, preferably within 10%, and more preferably within 5%. The quantity given here is, in general, which means that the meaning of "about" and "approximately" can still be implied without specific explanations.

Figure 1:
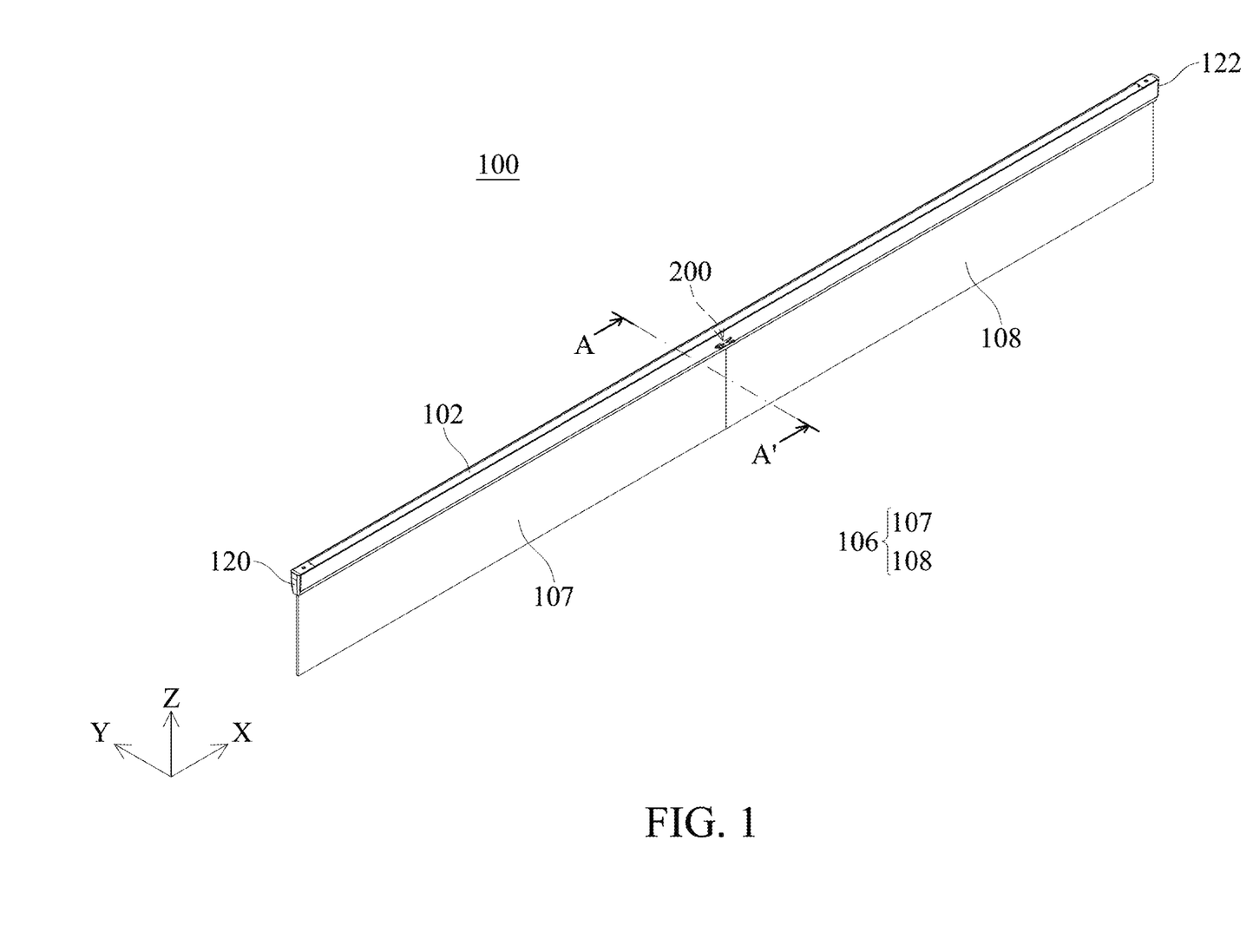
FIG. 1 is a schematic structural diagram showing a lighting device in accordance with an embodiment of this invention.
Figure 2:
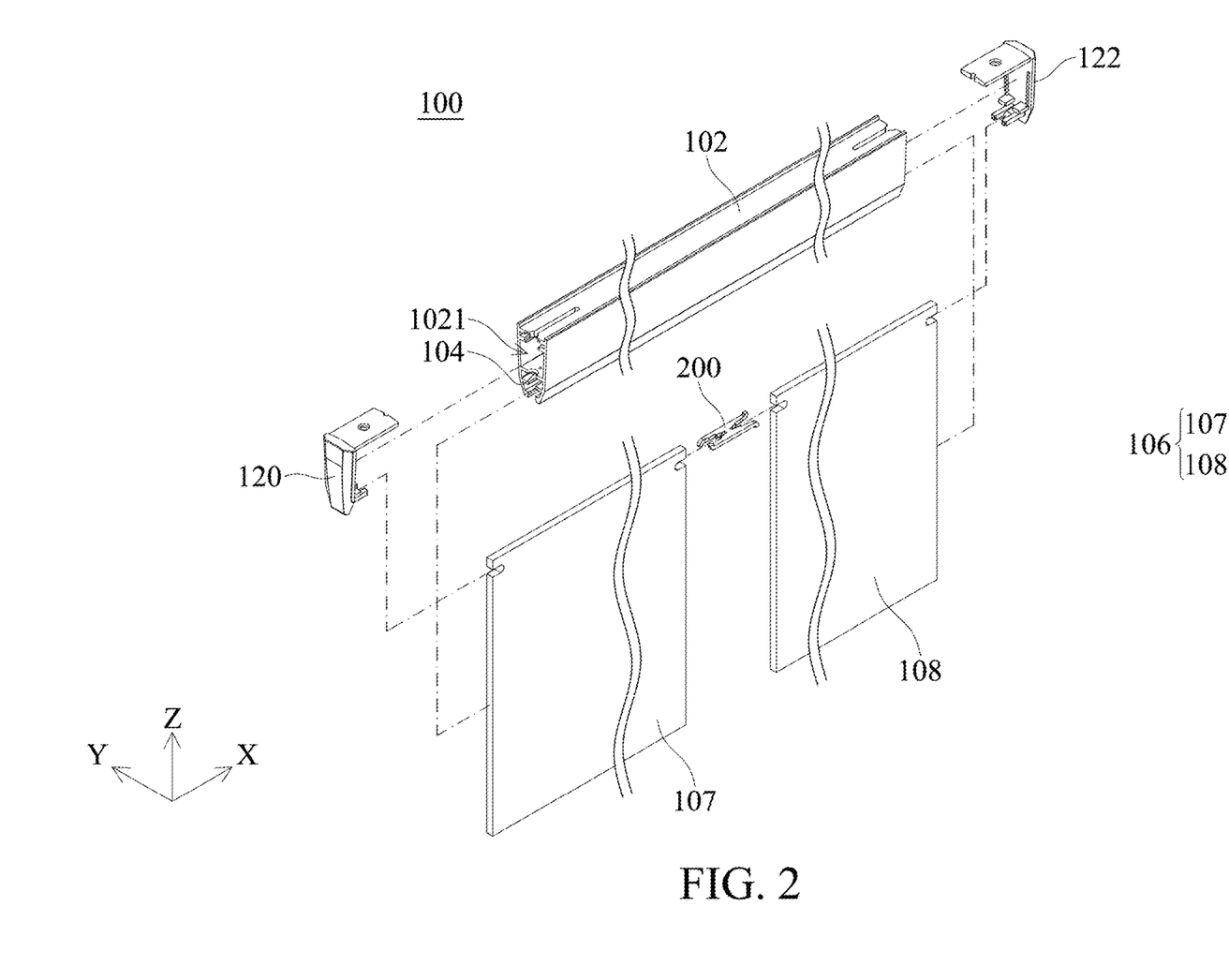
FIG. 2 is a schematic exploded view showing the lighting device in accordance with an embodiment of this invention.

Referring to FIGS. 1 and 2, FIG. 1 is a schematic structural diagram showing a lighting device 100 in accordance with an embodiment of this invention, and FIG. 2 is a schematic exploded view showing the lighting device 100 in accordance with an embodiment of this invention. In this embodiment, the lighting device 100 comprises a housing 102, a light source module 104, a light guiding module 106, a positioning member 200, and two covers 120, 122.

The housing 102 is extended along the X-axis to form a length, and is extended along the Y-axis to form a width. The housing 102 may have an accommodating space 1021, and the light source module 104 is disposed in the accommodating space 1021 to emit light. The light guide module 106 is configured to receive the light emitted from the light source module 104, and the light guide module 106 includes at least two light guide plates (light guide plate 107 and light guide plate 108).

In this embodiment, the positioning member 200 slidably enters the housing 102 from one side of the housing 102, and is disposed in the accommodating space 1021 of the housing 102. Then, the light guide plates 107, 108 enter the housing 102 from the opposite sides of the housing 102, so that the light guide plate 107 and the light guide plate 108 can be disposed in the accommodating space 1021 of the housing 102. The light guide plate 107 and the light guide plate 108 are coupled to the opposite sides of the positioning member 200, so that the positioning member 200 supports and positions the two light guide plates 107, 108. In addition to the above-mentioned assembly method, it is also possible to install one side of the positioning member 200 on either the light guide plate 107 or the light guide plate 108, so that the positioning member 200 can enter into the accommodation space 1021 along with the light guide plate. Then, the other light guide plate 107 or the light guide plate 108 is coupled to the other side of the positioning member 200, and the positioning member 200 can also be used to support and positions the light guide plate 107 and the light guide plate 108.

Furthermore, as shown in FIG. 2, the two covers 120, 122 are configured to cover the opposite sides of the housing 102, and are engaged with the light guide plate 107 and the light guide plate 108 to prevent the light guide plate 107 and the light guide plate 108 from disengaging from the housing 102.

Figure 3:
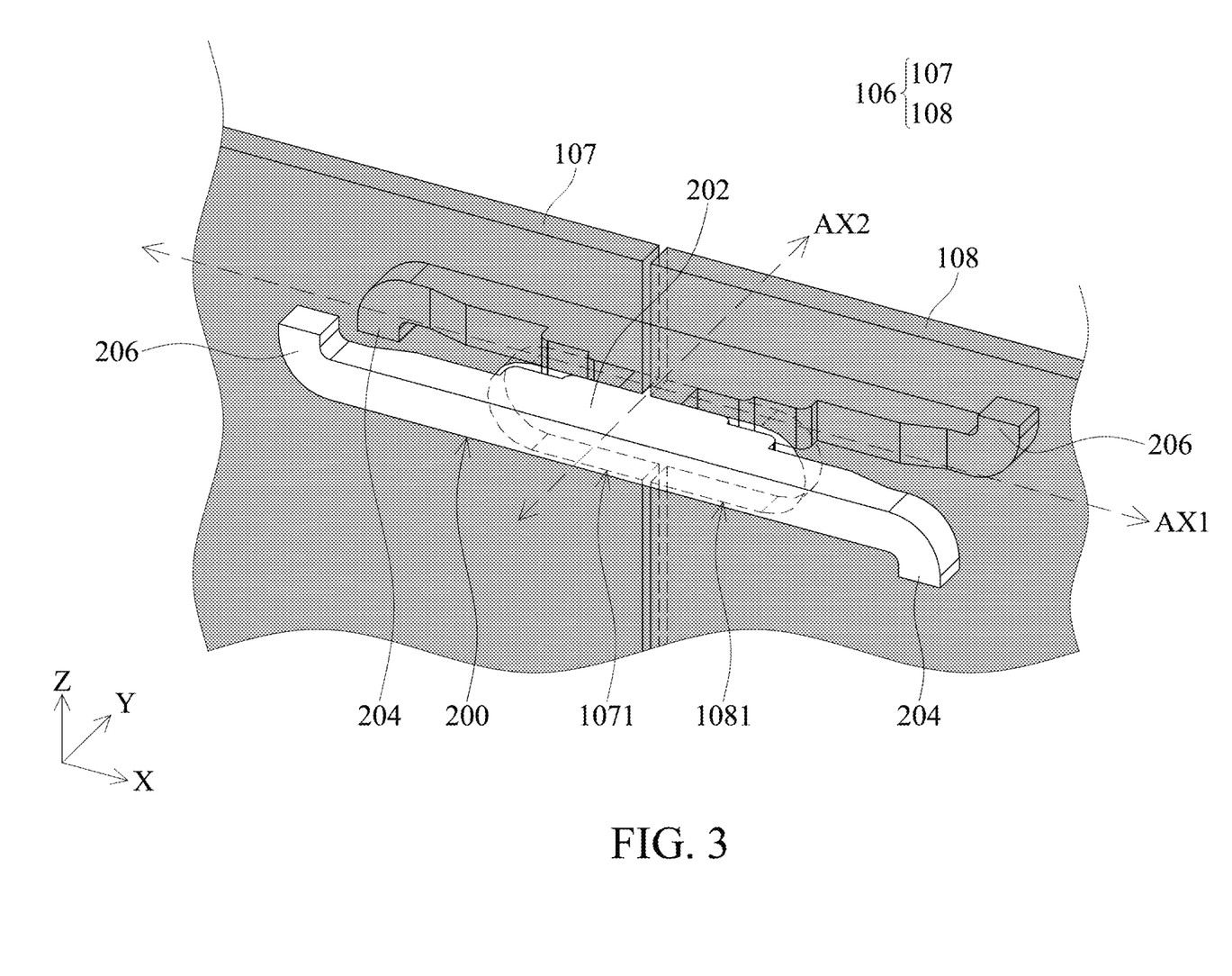
FIG. 3 is a schematic partial structural diagram showing a positioning member and two light guide plates in accordance with an embodiment of this invention.
Figure 4:
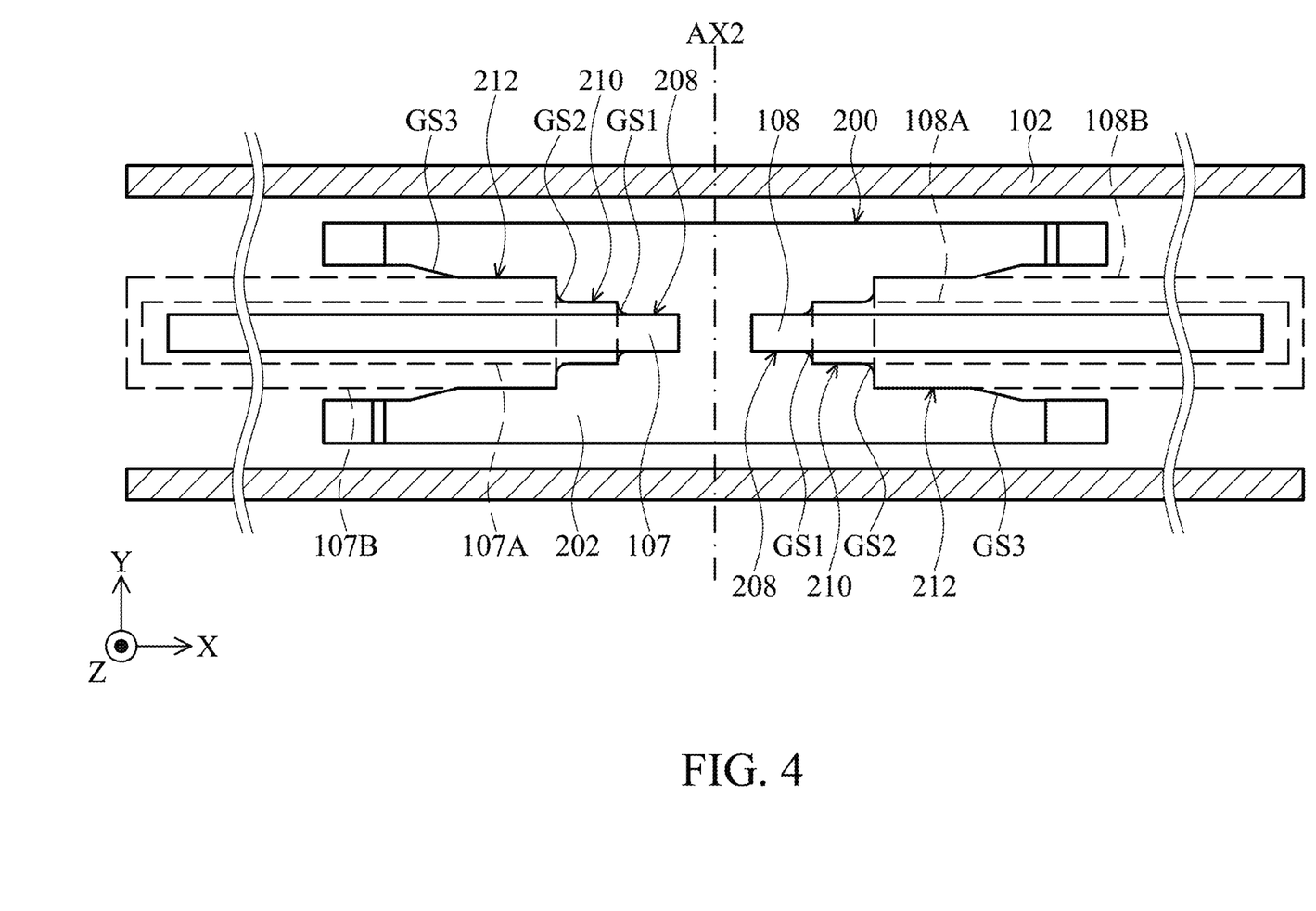
FIG. 4 is a partial top view showing a housing, the positioning member, and a light guiding module in accordance with an embodiment of this invention.

Referring to FIGS. 3 and 4, FIG. 3 is a schematic partial structural diagram showing a positioning member 200, a light guide plate 107, and a light guide plate 108 in accordance with an embodiment of this invention. FIG. 4 is a partial top view showing the housing 102, the positioning member 200, and a light guiding module 106 in accordance with an embodiment of this invention. As shown in FIGS. 3 and 4, the light guide plate 107 and the light guide plate 108 are engaged with the opposite sides of the positioning member 200.

As shown in FIG. 3, the positioning member 200 includes a body 202, two first convex portions 204, and two second convex portions 206. The body 202 has a generally H-shaped structure, and the two first convex portions 204 and the two second convex portions 206 are extended from the body 202 along the Z-axis.

In addition, as shown in FIGS. 3 and 4, the housing 102 can be extended along a long axis AX1 (parallel to the X-axis), and can be extended along a short axis AX2 (parallel to the Y-axis). The short axis AX2 and the long axis AX1 are perpendicular to each other. Through the above-mentioned configuration, the two first convex portions 204 and the two second convex portions 206 are extended in the opposite directions. When viewed along the Z-axis (the short axis AX2 is regarded as the X-axis, and the long axis AX1 is regarded as the Y-axis), the positioning member 200 is formed with four supporting points, in which the upper left corner (second quadrant) faces down, the lower left corner (third quadrant) faces up, the upper right corner (first quadrant) faces up, and the lower right corner (fourth quadrant) faces down.

As shown in FIG. 4, the positioning member 200 can be formed with two first notches 208. The two first notches 208 are symmetrical to the short axis AX2, and as shown in FIG. 3, the light guide plate 107 and the light guide plate 108 have a depression portion 1071 and a depression portion 1081 respectively. The depression portion 1071 and the depression portion 1081 are configured to be engaged with the corresponding first notches 208.

Furthermore, the positioning member 200 may further include at least two first guiding inclined surfaces GS1 which are configured to guide the light guide plate 107 and the light guide plate 108 into the corresponding first notches 208.

The positioning member 200 of the invention can match the light guide modules of different sizes. Specifically, the positioning member 200 may be further formed with two second notches 210 and two third notches 212. The second notches 210 communicate with the first notches 208, and the third notches 212 communicate with the second notches 210.

As shown in FIG. 4, the second notches 210 may correspond to two light guide plates 107A, 108A with larger dimension, so that the light guide plates 107A, 108A can be engaged with the corresponding second notches 210. Since the dimension of the light guide plates 107A, 108A along the short axis AX2 is greater than the dimension of the first notch 208 along the short axis AX2, it can prevent a thicker light guide plate from being inserted into the smaller first notch 208. Therefore, the goal of the error proofing can be achieved in the invention. Furthermore, the positioning member 200 further includes at least two second guiding inclined surfaces GS2 which are configured to guide the light plates 107A, 108A into the corresponding second notches 210.

Similarly, the third notches 212 may correspond to the two light guide plates 107B and 108B with more larger dimension, so that the light guide plates 107B and 108B can be engaged with the corresponding third notches 212. The positioning member 200 further includes at least two third guiding inclined surfaces GS3 which are configured to guide the light plates 107B and 108B into the corresponding third notches 212. With the design of the first notches 208, the second notches 210, and the third notches 212, the lighting device 100 of the embodiment of the invention can use light guide plates of various sizes and thicknesses. With the design of the first guiding inclined surfaces GS1, the second guiding inclined surfaces GS2 and the third guiding inclined surfaces GS3, the light guide plates can be smoothly slid into the first notches 208, the second notches 210, and the third notches 212 according to their thickness of the various light guide plates, so that it can prevent the light guide plates from collision on the corner, and no damages will occur during the sliding process.

Figure 5:
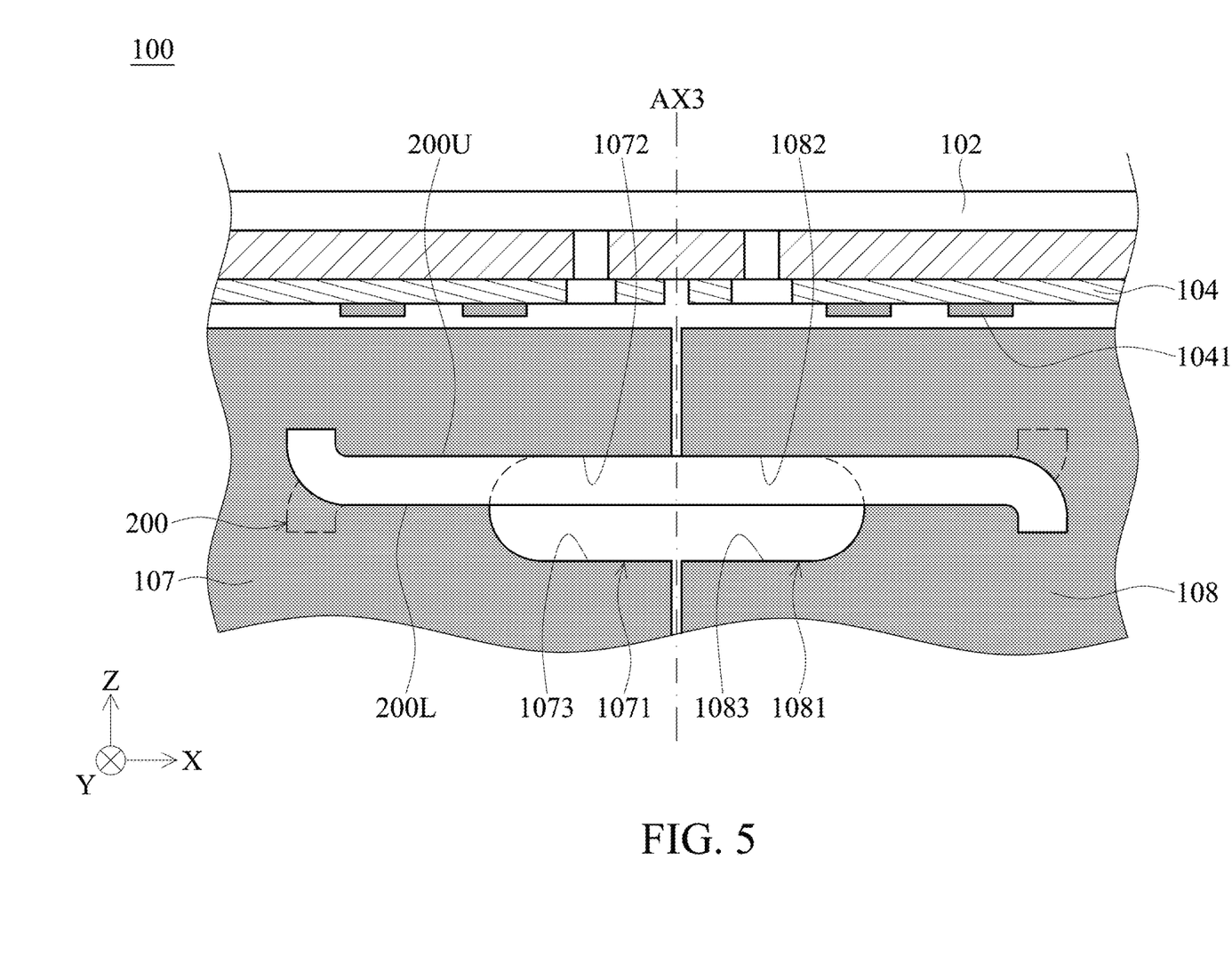
FIG. 5 is an enlarged perspective view showing partial structure of the lighting device in accordance with an embodiment of this invention.

Referring to FIG. 5, which is an enlarged perspective view showing partial structure of the lighting device 100 in accordance with an embodiment of this invention. The housing 102 forms a height along a central axis AX3. The central axis AX3 is perpendicular to the short axis AX2 and the long axis AX1, and the dimension of the depression portions 1071, 1081 along the central axis AX3 is greater than a thickness of the positioning member 200.

The depression portion 1071 has an upper surface 1072 and a lower surface 1073. The upper surface 1072 abuts against a top surface 200U of the positioning member 200, and a bottom surface 200L of the positioning member 200 does not abut against the lower surface 1073 of the positioning member 200. Similarly, the upper surface 1082 of the depression portion 1081 abuts against the top surface 200U of the positioning member 200, and the bottom surface 200L of the positioning member 200 does not abut against the lower surface 1083 of the depression portion 1081. Since the weight of the light guide plates 107, 108 are in the downward direction, the upper surfaces 1072 and 1082 of the corresponding depression portions 1071 and 1081 serve as supporting surfaces to support the light guide plates 107, 108 when the light guide plates 107, 108 hang in the corresponding depression portions 1071, 1081. By the aforementioned design, the supporting stability of the light guide plates 107, 108 can be improved.

Since the light guide plates 107 and 108 abut against the top surface 200U of the positioning member 200 at the same time, the distance between the light guide plate 107 and the light-emitting elements 1041 of the light source module 104 along the central axis AX3 is equal to the distance between the light guide plate 108 and the light-emitting elements 1041 of the light source module 104 along the central axis AX3. Therefore, the light emitted from the lighting device 100 can have a uniform brightness effect.

Figure 6:
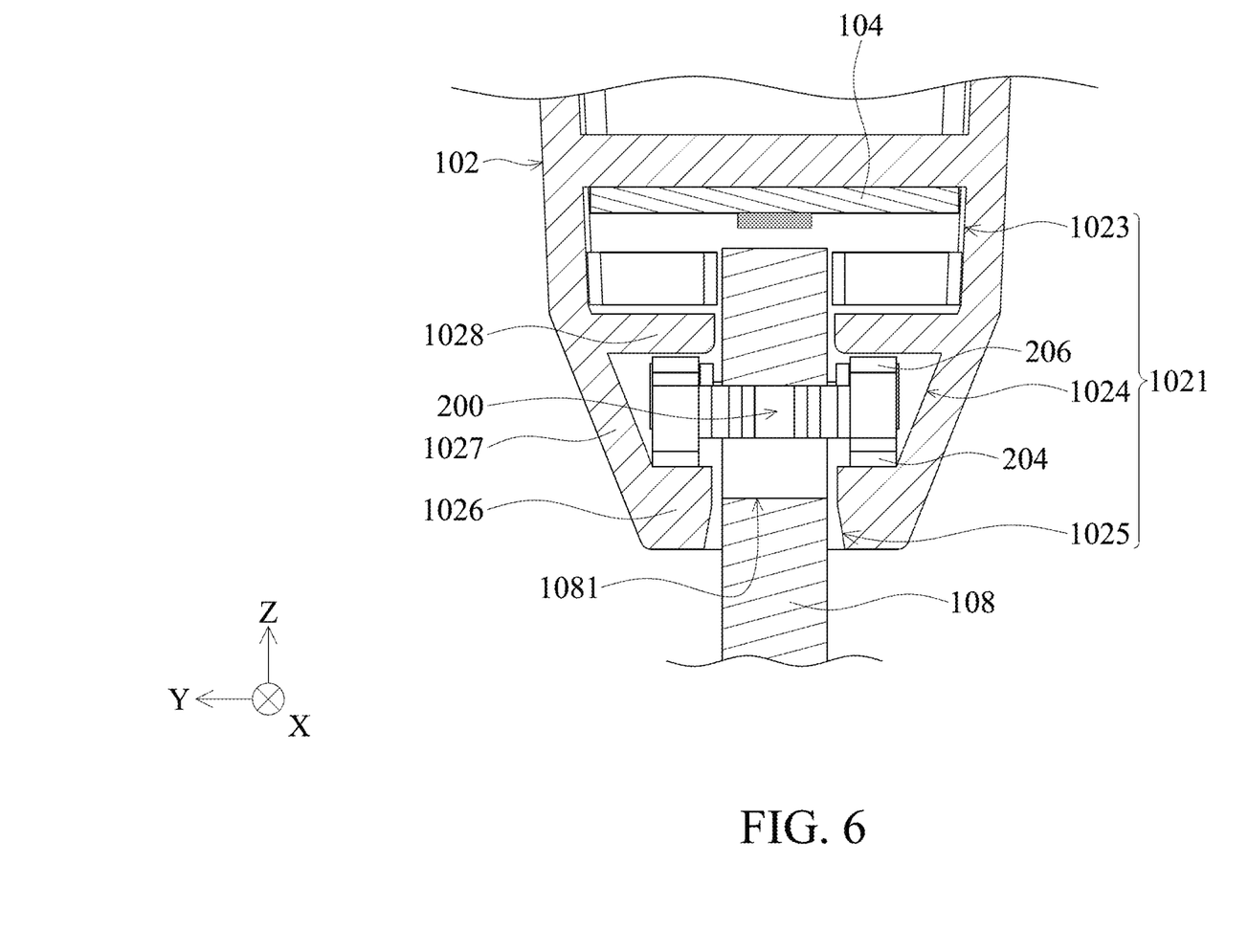
FIG. 6 is a schematic cross-sectional view taken along line A-A' in FIG. 1 in accordance with an embodiment of this invention.

Referring to FIG. 6, which is a schematic cross-sectional view taken along line A-A' in FIG. 1 in accordance with an embodiment of this invention. As shown in FIG. 6, the accommodating space 1021 of the housing 102 has a first passage 1023, a second passage 1024, and an opening 1025. The second passage 1024 is located between the first passage 1023 and the opening 1025, and communicates with each other. The light source module 104 is disposed in the first passage 1023 of the accommodating space 1021, and the positioning member 200 is located in the second passage 1024 of the accommodating space 1021. The light guide plate 108 is extended outside of the opening 1025. Since the positioning member 200 and the light source module 104 are located in different passages, the positioning member 200 will not affect or collide with the light source module 104 located in the first passage 1023 when the positioning member 200 is shifted in the second passage 1024. By the aforementioned design, it will help to prevent the damage of the light source module 104.

Furthermore, the housing 102 has a first section 1026, a second section 1027, and a third section 1028. The second section 1027 is connected between the first section 1026 and the third section 1028. Moreover, the first section 1026 and the second section 1027 are configured to restrict the movement of the positioning member 200 along the second passage 1024. The first section 1026 surrounds and defines the opening 1025 of the accommodating space 1021, the second section 1027 surrounds and defines the second passage 1024 of the accommodating space 1021, and the third section 1028 surrounds and defines the first passage 1023 of the accommodating space 1021. Since the first passage 1023 and the second passage 1024 are separated by the third section 1028, the movement of the positioning member 200 in the second passage 1024 will not affect or collide with the light source module 104 located in the first passage 1023.

It is worth noting that the first convex portion 204 is configured to abut against the first section 1026, and the second convex portion 206 is configured to abut against the third section 1028. In such way, the first convex portions 204 and the second convex portions 206 serve as four support points at four positions of left, right, up and down, and the positioning member 200 in the second passage 1024 can be firmly held by the first section 1026 and the third section 1028. Since the positioning member 200 can maintain a stable position in the second passage 1024, no deviation will occur. Therefore, one side of the positioning member 200 can be installed on either the light guide plate 107 or the light guide plate 108, and is inserted into the accommodating space 1021, and then the other light guide plate 107 or the light guide plate 108 is coupled to the other side of the positioning member 200. At this time, even if the assembly positions of the other light guide plate and the positioning member 200 are hidden in the accommodating space 1021, and cannot be seen during the assembly process, the positioning member 200 still can be inserted into the depression portions 1071, 1081 smoothly due to the dimension of depression portions 1071, 1081 along the central axis AX3 is greater than a thickness of the positioning member 200. In such way, the light guide plate can be easily installed into the depression portions 1071, 1081, and there is no need for precise alignment and visual observation. Besides, since the positioning member 200 maintains a stable position in the second passage 1024 without deviations, the light guide plate can be assembled with the positioning member 200 in the correct position to avoid the misalignment of the light guide plate during assembling. Therefore, it can facilitate assembly accuracy and assembly efficiency.

Figure 7:
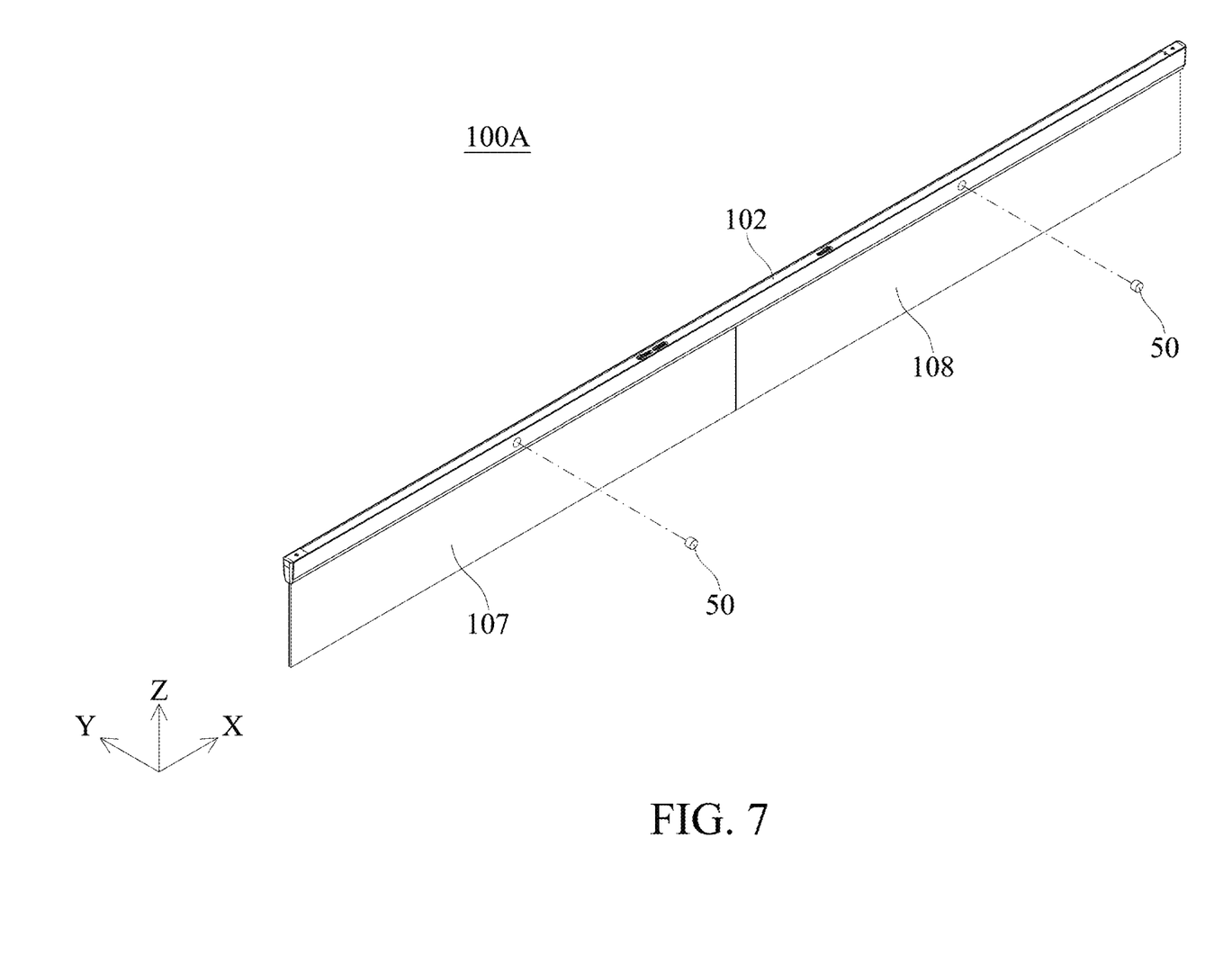
FIG. 7 is a schematic structural diagram showing a lighting device in accordance with another embodiment of this invention.

Referring to FIG. 7, which is a schematic structural diagram showing a lighting device 100 in accordance with another embodiment of this invention. In this embodiment, the lighting device 100A may further comprise two fixing elements 50. Each of the fixing elements 50 passes through the housing 102 and the corresponding light guide plate, so that the light guide plates 107, 108 are more securely fixed to the housing 102.

The lighting device 100 includes a housing 102, a positioning member 200, and two light guide plates 107 and 108. The positioning member 200 can be made of metal materials and slidably disposed in the housing 102, and the light guide plates 107 and 108 can be clamped on the opposite sides of the positioning member 200. Since the light guide plates 107 and 108 abut against the top surface 200U of the positioning member 200 at the same time, the distance between the light guide plates 107 and 108 and the light source module 104 can be equal and well optical coupling, so that the lighting device 100 can have better optical efficiency.

In addition, when the light guide plates 107, 108 expand due to environmental factors, the positioning member 200 can move accordingly in accordance with the expansion. Therefore, the design of the invention can prevent from deformation or bad optical properties when the light guide plates 107 and 108 are expanded to squeeze and collide with each other.

Furthermore, due to the design of the positioning member 200 of the invention, the components for fixing the light guide plates 107 and 108 can be greatly reduced to keep costs down.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope, such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of the preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A lighting device, comprising:
a housing, including an accommodating space;
a light source module, disposed in the accommodating space;
a light guiding module, configured to receive the light emitted from the light source module, and the light guiding module including at least two light guiding plates; and
a positioning member, slidably disposed in the accommodating space of the housing;
wherein the two light guide plates are configured in the accommodating space of the housing and are coupled to the opposite sides of the positioning member, so that the positioning member supports and positions the two light guide plates.

2. The lighting device as claimed in claim 1, wherein the accommodating space of the housing has a first passage, a second passage, and an opening;
wherein the second passage is located between the first passage and the opening and communicates with each other, the light source module is disposed in the first passage of the accommodating space, the positioning member is located in the second passage of the accommodating space, and the two light guide plates are extended outside of the opening.

3. The lighting device as claimed in claim 2, wherein the housing has a first section, a second section, and a third section, the second section is connected between the first section and the third section, and the first section and the second section restrict the movement of the positioning member along the second passage;

wherein the first section surrounds and defines the opening of the accommodating space, the second section surrounds and defines the second passage of the accommodating space, and the third section surrounds and defines the first passage of the accommodating space.

4. The lighting device as claimed in claim 3, wherein the positioning member further includes at least two first convex portions for abutting against the first section.

5. The lighting device as claimed in claim 4, wherein the positioning member further includes at least two second convex portions for abutting against the third section.

6. The lighting device as claimed in claim 5, wherein the first convex portion and the second convex portion are extended in the opposite directions.

7. The lighting device as claimed in claim 1, wherein the housing is extended along a long axis to form a length and forms a width along a short axis, the short axis and the long axis are perpendicular to each other, the positioning member is formed with two first notches, the two first notches are symmetrical to the short axis, and each of the two light guide plates has a depression portion to be engaged with the corresponding first notch.

8. The lighting device as claimed in claim 7, wherein the housing forms a height along a central axis, the central axis is perpendicular to the short axis and the long axis, and the dimension of the depression portion along the central axis is greater than a thickness of the positioning member.

9. The lighting device as claimed in claim 7, wherein the depression portion has an upper surface and a lower surface, the upper surface abuts against a top surface of the positioning member, and the bottom surface of the positioning member does not abut against the lower surface.

10. The lighting device as claimed in claim 7, wherein the positioning member further includes two first guiding inclined surfaces which guide each of the light guide plates into the corresponding first notch.

11. The lighting device as claimed in claim 1, wherein the housing is extended along a long axis to form a length and forms a width along a short axis, the short axis and the long axis are perpendicular to each other, the positioning member is formed with two first notches and two second notches, the two second notches communicate with the first notches, each of the two light guide plates has a depression portion to be engaged with the corresponding second notch;

wherein the dimension of the light guide plates along the short axis is greater than the dimension of the first notch along the short axis.

12. The lighting device as claimed in claim 11, wherein the positioning member further includes two second guiding inclined surfaces, which guide each of the light guide plates into the corresponding second notch.

13. The lighting device as claimed in claim 1, further includes two fixing elements, and each of the fixing elements pass through the housing and the corresponding light guide plate, so that the light guide plates are fixed to the housing.

* * * * *